Patented Sept. 13, 1949

2,481,513

UNITED STATES PATENT OFFICE 2,481,513

DRILLING FLUIDS AND METHOD OF USING SAME

William M. Hutchinson, Bartlesville, Okla., assignor to Phillips Petroleum Company, a corporation of Delaware No Drawing. Application October 14, 1947, Serial No. 779,833

12 Claims. (Cl. 252—8.5)

The invention relates to water base drilling muds containing a metal salt of carboxyethyl cellulose ether soluble in aqueous solutions having a pH of 9, said metal being selected from the group consisting of the metals of groups IB, IIB, IV, V, VI, VII, and VIII of the periodic series of elements as shown on page 118 of J. W. Mellor's Modern Inorganic Chemistry (revised and edited by G. D. Parkes, and published by Longmans, Green & Company, 1939) which salts are hereinafter referred to as heavy metal carboxyethyl cellulose ethers. In one aspect it relates to drilling fluids suitable for drilling in heaving shale. In another aspect it relates to drilling fluids having a high salt content due either to deliberate addition of salt or due to contamination of the mud with salt from natural formations or from connate waters. In still another aspect it relates to methods of drilling or controlling wells with such fluids.

In the art of drilling wells, especially by the rotary method, it is necessary to use a drilling mud, as is well understood in the art. The drilling mud lubricates the drill string, carries the cuttings to the surface of the well, and forms a filter cake on the walls of the well to prevent the loss of at least any substantial amount of water from the drilling mud to the natural formations penetrated. In order to perform these important functions properly, the drilling mud must have suitable viscosity, gel strength, and water loss properties at all times in spite of adverse conditions encountered in drilling the well.

In drilling wells there are two major difficulties caused by natural formations penetrated. One of these difficulties is the encountering of salt formations. Salt will cut ordinary drilling mud so that the clay particles are flocculated and its viscosity becomes entirely too high, and there is grave danger of the drilling pipe twisting in half, or of gas cutting the mud, or of a blowout occurring due to the salt cutting of this mud. Another difficulty is the encountering of formations known as heaving shale. A heaving shale absorbs water from the drilling mud and by a caving or disintegrating action common to clay and shale, or by a swelling action common to bentonite materials, the well hole is closed around the drill string, choking off the circulation of drilling mud and often seizing the drill string so that it twists in half.

The principal object of my invention is to produce a drilling mud which can be used not only in ordinary formations but which will resist the contamination by salt and which will reduce the loss of water from the mud to the formations penetrated and the resultant swelling and caving of heaving shale or similar formations.

Another object is to provide an improved drilling mud.

Another object is to provide an improved method of drilling wells.

A further object is to provide a drilling mud containing a heavy metal salt of carboxyethyl cellulose ether which is soluble in an aqueous solution of pH of 9.

Another object is to provide a drilling mud containing a heavy metal carboxyethyl cellulose ether and a salt.

Numerous other objects and advantages of the invention will be apparent to those skilled in the art upon reading the following specification and the accompanying claims.

OPERATIONS

In the present invention, I prefer to employ as a colloidal suspending agent or dispersing agent in my drilling mud, a heavy metal carboxyethyl cellulose ether which is soluble in an aqueous solution having a pH of 9. One method for the preparation of carboxyethyl cellulose ether is set forth in my copending application, Serial No. 729,199, filed February 17, 1947. Other methods for the preparation of carboxyethyl-cellulose ether are fully described in U. S. Patent No. 2,332,048, which was issued October 19, 1943, and U. S. Patent No. 2,349,797, which was issued May 30, 1944. Carboxyethylcellulose ether prepared by any other method known to the art may be used in my invention.

I have found that 4 lbs. of dry powdered heavy metal carboxyethyl cellulose ether per 42 gallon barrel of mud gives a satisfactory and economical mixture. Below 0.25 lb. per barrel, the treating effect is generally too small. If the amount is increased very much above 10 lbs. per barrel, the 10 minute gel strength becomes too high for efficient circulation with the well pumps. I prefer to use from 0.5 to 3 lbs. per barrel. The amount used depends on the nature of the earth formations encountered in the drilling. Because of the difference in degradation of the cellulose employed and differences in natural formations encountered, I prefer to give functional rather than numerical limits of an amount sufficient to reduce the water loss due to filtration through the filter cake, but insufficient to increase the viscosity of the drilling mud to such an extent that it cannot be circulated.

The degree of substitution of carboxyethyl groups in the cellulose molecule is not critical except that it must be in the range such that the desired metal salts are soluble. Degradation of the cellulose should be held to a minimum since an excessive degree of degradation of the cellulose molecules has a detrimental effect on the efficacy of the heavy metal carboxyethyl cellulose ethers as drilling mud components.

The heavy metal carboxyethyl cellulose ether may be in dry powdered form, the particle size not being critical. To speed up the solution of any slowly soluble heavy metal carboxyethyl cellulose ether, any suitable solubilizing agent may be added first such as alcohol.

In rotary drilling, the usual methods consist of adding the heavy metal carboxyethyl cellulose ether as a powder to the drilling fluid flowing in the mud ditch to the pump intake or to the mud pit by scattering the powder over the surface. An alternative method would be to make up a more or less concentrated solution of the heavy metal carboxyethyl cellulose ether and add that in a stream to the drilling mud. In some instances a pure mixture of water and heavy metal carboxyethyl cellulose ether may be used at the start as the well drilling or well controlling fluid, but mud is picked up in drilling or otherwise added. The drilling fluid containing the heavy metal carboxyethyl cellulose ether is pumped in circulation or reverse circulation in the drill string or used to fill the well in usual operations of well drilling or well controlling of the prior art.

When the heavy metal carboxyethyl cellulose ether is so used in sufficient amount, a new result is achieved in that salt water does not cut the mud qualities enough to ruin it for drilling, and formations exposed to it do not tend to cave or heave enough to stop the drilling. Suitable control of viscosities and other drilling mud qualities may be maintained by the use of phosphates, alkalis, and/or quebracho as desired.

Since the concentration of heavy metal carboxyethyl cellulose ether in the drilling mud is small, it is undesirable to lose any of it by precipitation because such diminution would have a detrimental effect on the drilling mud. Fortunately no such precipitation by the metal ions present in drilling all usual earth formations need be feared. Reference to Table I will reveal that at the pH generally maintained in the wells, all of the carboxyethyl cellulose ether salts are soluble and therefore would not precipitate in the wells.

Any use of a heavy metal carboxyethyl cellulose ether to be retained as a soluble dispersing agent throughout the entire normal life of the drilling mud is not to be confused with the use of some alkali or acid soluble cellulose which is to be precipitated in mass by dilution with water, heat or other means to form an insoluble plugging agent in the formation. I do not use my heavy metal carboxyethyl cellulose ether as such a mass plugging agent.

The mode or theory of operation by which the heavy metal carboxyethyl cellulose ether protects the surface of the clay or bentonite from attack by water is obscure, but it is believed that as the water attempts to enter the clay, the heavy metal carboxyethyl cellulose ether forms a layer of protective material on the outside of the clay or bentonite, preventing the clay or bentonite from absorbing water from the drilling mud.

Heavy metal carboxyethyl cellulose ether containing drilling muds often have a low initial gel strength which allows gas bubbles to come out of the mud so rapidly that the possibility of gas cutting is greatly reduced. Reduction of gas cutting reduces the chances of blowouts. Heavy metal carboxyethyl cellulose ether drilling muds are often characterized by very thin filter cake thickness and by their small water loss or complete absence of water loss. This is very useful in avoiding loss of water to the formation and the resulting swelling or caving of the formation which occurs in some instances. These muds do not generally ferment or spoil. Numerous other advantages of my heavy metal carboxyethyl cellulose ether drilling muds will be apparent from a study of the following representative examples.

Example A

Carboxyethyl cellulose ether may be prepared by the reaction of acrylonitrile with cellulose in the presence of caustic soda and subsequent hydrolysis to the sodium salt of carboxyethyl cellulose ether. The product is a white, brittle solid that can be easily powdered. The acid carboxyethyl cellulose ether can be liberated from an aqueous solution of the sodium salt by addition of hydrochloric acid. The various metal salts of carboxyethyl cellulose ether may be prepared by the addition of a salt of the desired metal to an aqueous solution of the free acid carboxyethyl cellulose ether followed by precipitation by the addition of alcohol, acetone or a similar non-polar solvent.

Example B

In order to test the solubility of the various metal carboxyethyl cellulose ethers in water, samples of solutions of the salt to be tested were added to individual portions of a 1% solution of sodium carboxyethyl cellulose ether under varying conditions of pH. The following salts were tested at the approximate pH's indicated. The formation of an organic precipitate is indicated by ppt. The absence of any organic precipitate is indicated by a dash (—).

Table I

|  | pH 3 | pH 7.5 | pH 9 |
|---|---|---|---|
| $Hg(NO_3)_2$ | ppt. | ppt. | — |
| $Mn(NO_3)_2$ | — | — | — |
| $SnCl_2$ | ppt | ppt. | — |
| $Cd(NO_3)_2$ | — | — | — |
| $Bi(NO_3)_3$ | — | — | — |
| $CoCl_2$ | — | — | — |
| $Sb_2(SO_4)_3$ | — | — | — |
| $NiSO_4$ | — | — | — |
| $Pb(NO_3)_2$ | — | — | — |
| $Cr_2(SO_4)_3 \cdot K_2SO_4$ | — | — | — |
| $FeCl_3$ | — | — | — |
| $CuSO_4$ | — | — | — |

From these tests, it is apparent that the metal salts of carboxyethyl cellulose ether would all be soluble in drilling muds having a pH of 9. The fact that the mercuric and stannic salts are insoluble below a pH of 7.5 would not prevent their use since drilling muds would almost always have a pH above 7.5. Mercury and tin salts are relatively minor constituents or are entirely absent in most well formations. These heavy metal carboxyethyl cellulose ethers may be used in any drilling mud having a pH at which the said heavy metal carboxyethyl cellulose ether is soluble. For example, a reference to Table I will reveal that, with the exception of the tin and mercury salts, the heavy metal carboxyethyl cellulose ethers may be used in muds with pH's from 3 to 14.

EXAMPLE C

The following Tables II and III show treating effect to be realized when a mud of the following composition: Ezmex (a native Texas clay) 8.10%, bentonite 0.80%, BaSO₄ 26.30%, BaCO₃ 0.80%, water 64.00%, is admixed with the indicated dosages of the indicated salt of carboxyethyl cellulose ether.

*Table II*

|  |  | Carboxyethyl Cellulose Salt of— | | | |
|---|---|---|---|---|---|
|  |  | Mercury | Lead | Iron | Copper |
| Dosage, lbs./bbl | 0 | 0.79 | 0.59 | 0.59 | 0.59 |
| Viscosity, cps | 17.5 | 8 | 4 | 22 | 15 |
| Initial gel, gms | 30 | 2 | 5 | 5 | 0 |
| 10 min. gel, gms | 50 | 10 | 27 | 84 | 24 |
| 30 min. water loss, ml | 29 | 21 | 23 | 16 | 16 |
| pH of filtrate | 9 | 8.9 | 8.3 | 7.9 | 8.1 |

*Table III*

|  |  | Carboxyethyl Cellulose Salt of— | | | |
|---|---|---|---|---|---|
|  |  | Mercury | Lead | Iron | Copper |
| Dosage, lbs./bbl | 0 | 3 | 3 | 3 | 3 |
| Viscosity, cps | 17.5 | 26 | 32 | 28 | 18 |
| Initial gel, gms | 30 | 0 | 0 | 0 | 0 |
| 10 min. gel, gms | 50 | 17 | 26 | 21 | 16 |
| 30 min. water loss, ml | 29 | 6 | 11 | 8 | 7 |
| pH of filtrate | 9 | 9.2 | 9.2 | 9.2 | 9.2 |

It is seen that the mud has a water loss of 29 ml. in 30 minutes. An aqueous solution of a heavy metal carboxyethyl cellulose of a concentration of 10 lbs. per barrel has a complete water loss as all of it will pass a dense filter paper in less than one minute under the same standard test conditions. Yet a combination of the two as shown in Table II, above, results in suitably reduced water losses. A combination therefore exists between the suspended solids or clay particles and the heavy metal carboxyethyl cellulose which combination forms a seal on the walls of the well.

In the use of heavy metal carboxyethyl cellulose ether, as has been found in the use of alkali metal and ammonium carboxymethyl cellulose and of alkali metal, alkaline earth metal and ammonium carboxyethyl cellulose ether, it has been found desirable in some instances to add an alkali such as sodium hydroxide or calcium hydroxide or both, and sometimes quebracho to reduce or control the viscosity of the drilling mud. Sufficient alkali may be added to the mud to maintain a pH of about 12 which seems to be the optimum for maintaining the desired properties. Drilling muds which do not contain carboxyalkyl cellulose ether salts are more sensitive to addition of lime than those which do, and need more quebracho whereas with carboxyalkyl cellulose ether salts present, the amount of quebracho can be reduced or even eliminated entirely.

Finely ground weighting agents, such as barium sulfate in powdered form, may be used in combination with heavy metal carboxyethyl cellulose ether drilling muds without detrimental effect. Heavy metal carboxyethyl cellulose ethers are somewhat inert chemically and all of the treating and controlling agents of the well drilling fluid arts may after a simple test for solubility and lack of obvious adverse reaction be employed without invention with my heavy metal carboxyethyl cellulose ether in drilling fluids.

The above simple examples are merely representative and are given to show how heavy metal carboxyethyl cellulose ethers may be used in water base drilling muds by those skilled in the art.

It is understood that while a theory of operation has been advanced, it is not the only or necessary one, but has been advanced merely to facilitate the disclosure. It is obvious that various changes may be made in the details without departing from the spirit of this invention nor from the scope of the invention as defined by the following claims. It is to be understood that this invention is not to be limited to the specific details described. My invention is therefore to be defined by the following claims.

Having fully described my invention, I claim:

1. In a process of drilling wells comprising the steps of drilling the well with well drilling tools, and circulating through the well during said drilling a water base drilling mud which forms a filter cake on the wall of the well, the improvement comprising incorporating in said drilling mud a metal salt of carboxyethyl cellulose ether, soluble in an aqueous solution having a pH of 9, said metal being selected from the group consisting of the metals of groups IB, IIB, IV, V, VI, VII and VIII of the periodic series of the elements, in an amount sufficient to reduce the water loss due to filtration through said filter cake but insufficient to increase the viscosity of said drilling mud to such an extent that it cannot be circulated.

2. In a process of drilling wells comprising the steps of drilling the well with well drilling tools, and circulating through the well during said drilling a water base drilling mud which forms a filter cake on the wall of the well, the improvement comprising incorporating in said drilling mud a water soluble lead carboxyethyl cellulose ether in an amount sufficient to reduce the water loss due to filtration through said filter cake but insufficient to increase the viscosity of said drilling mud to such an extent that it cannot be circulated.

3. In a process of drilling wells comprising the steps of drilling the well with well drilling tools, and circulating through the well during said drilling a water base drilling mud which forms a filter cake on the wall of the well, the improvement comprising incorporating in said drilling mud a water soluble iron carboxyethyl cellulose ether in an amount sufficient to reduce the water loss due to filtration through said filter cake but insufficient to increase the viscosity of said drilling mud to such an extent that it cannot be circulated.

4. In a process of drilling wells comprising the steps of drilling the well with well drilling tools, and circulating through the well during said drilling a water base drilling mud which forms a filter cake on the wall of the well, the improvement comprising incorporating in said drilling mud a water soluble copper carboxyethyl cellulose ether in an amount sufficient to reduce the water loss due to filtration through said filter cake but insufficient to increase the viscosity of said drilling mud to such an extent that it cannot be circulated.

5. A water base well drilling mud comprising in combination sufficient water to maintain the mud as a fluid, sufficient clayey material to form a filter cake on the wall of the well, and a metal salt of carboxyethyl cellulose ether soluble in an aqueous solution having a pH of 9, said metal being selected from the group consisting of the metals of groups IB, IIB, IV, V, VI, VII and VIII of the periodic series of the elements, in an amount sufficient to reduce the water loss due to filtration through said filter cake without increasing the viscosity of said well drilling mud to such an extent that it cannot be circulated.

6. A water base well drilling mud comprising in combination sufficient water to maintain the mud as a fluid, sufficient clayey material to form a filter cake on the wall of the well, and a water soluble lead carboxyethyl cellulose ether in an amount sufficient to reduce the water loss due to filtration through said filter cake without increasing the viscosity of said well drilling mud to such an extent that it cannot be circulated.

7. A water base well drilling mud comprising in combination sufficient water to maintain the mud as a fluid, sufficient clayey material to form a filter cake on the wall of the well, and a water soluble iron carboxyethyl cellulose ether in an amount sufficient to reduce the water loss due to filtration through said filter cake without increasing the viscosity of said well drilling mud to such an extent that it cannot be circulated.

8. A water base well drilling mud comprising in combination sufficient water to maintain the mud as a fluid, sufficient clayey material to form a filter cake on the wall of the well, and a water soluble copper carboxyethyl cellulose in an amount sufficient to reduce the water loss due to filtration through said filter cake without increasing the viscosity of said well drilling mud to such an extent that it cannot be circulated.

9. A water base well drilling mud comprising an aqueous fluid mixture containing suspended solids which form a filter cake on the wall of the well, and a metal salt of carboxyethyl cellulose ether soluble in an aqueous solution having a pH of 9, said metal being selected from the group consisting of the metals of groups IB, IIB, IV, V, VI, VII and VIII of the periodic series of the elements, in an amount sufficient to reduce the water loss due to filtration through said filter cake without increasing the viscosity of said well drilling mud to such an extent that it cannot be circulated.

10. A water base well drilling mud comprising an aqueous fluid mixture containing suspended solids which form a filter cake on the wall of the well, and a water soluble lead carboxyethyl cellulose ether in an amount sufficient to reduce the water loss due to filtration through said filter cake without increasing the viscosity of said well drilling mud to such an extent that it cannot be circulated.

11. A water base well drilling mud comprising an aqueous fluid mixture containing suspended solids which form a filter cake on the wall of the well, and a water soluble iron carboxyethyl cellulose ether in an amount sufficient to reduce the water loss due to filtration through said filter cake without increasing the viscosity of said well drilling mud to such an extent that it cannot be circulated.

12. A water base well drilling mud comprising an aqueous fluid mixture containing suspended solids which form a filter cake on the wall of the well, and a water soluble copper carboxyethyl cellulose ether in an amount sufficient to reduce the water loss due to filtration through said filter cake without increasing the viscosity of said well drilling mud to such an extent that it cannot be circulated.

WILLIAM M. HUTCHINSON.

REFERENCES CITED

The following references are of record in the file of this patent:

UNITED STATES PATENTS

| Number | Name | Date |
| --- | --- | --- |
| 2,129,913 | Cross et al. | Sept. 13, 1938 |
| 2,417,307 | Larsen | Mar. 11, 1947 |
| 2,425,768 | Wagner | Aug. 19, 1947 |